(12) United States Patent
Wells

(10) Patent No.: US 7,808,624 B2
(45) Date of Patent: Oct. 5, 2010

(54) INSPECTING END SURFACES OF FIBER OPTIC CONNECTORS

(75) Inventor: Dennis Ray Wells, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 45 days.

(21) Appl. No.: 11/956,516

(22) Filed: Dec. 14, 2007

(65) Prior Publication Data

US 2008/0304051 A1    Dec. 11, 2008

Related U.S. Application Data

(60) Provisional application No. 60/870,280, filed on Dec. 15, 2006.

(51) Int. Cl.
*G01N 21/00* (2006.01)
(52) U.S. Cl. ....................................... 356/73.1
(58) Field of Classification Search ............... None
See application file for complete search history.

(56) References Cited

U.S. PATENT DOCUMENTS

| | | | |
|---|---|---|---|
| 5,459,564 A * | 10/1995 | Chivers | ............ 356/73.1 |
| 5,577,149 A | 11/1996 | Averbeck | |
| 6,215,555 B1 | 4/2001 | Chivers | |
| 6,396,996 B1 | 5/2002 | Carpenter | |
| 6,831,738 B2 | 12/2004 | Rogers | |
| 6,987,921 B2 | 1/2006 | Suek | |
| 6,992,777 B2 | 1/2006 | Han | |
| 7,068,906 B2 | 6/2006 | Bianchi | |
| 2003/0174875 A1* | 9/2003 | Buzzetti | ............ 382/141 |
| 2005/0206889 A1 | 9/2005 | Koudelka | |

* cited by examiner

*Primary Examiner*—Tu T Nguyen
(74) *Attorney, Agent, or Firm*—Merchant & Gould P.C.

(57) ABSTRACT

A system for inspecting the end faces of fiber optic connectors includes a fixture holding a plurality of fiber optic connectors. The system also includes an inspection device configured to inspect end faces of each of the fiber optic connectors, the inspection device including a movement device to which the fixture is coupled, the movement device being configured to move the inspection device relative to the fixture to allow all of the end faces to be inspected. The system also includes a computer system connected to the inspection device, the computer system being programmed to control the inspection device, display inspection data from the inspection device, and store the inspection data.

8 Claims, 7 Drawing Sheets

INSPECTING END SURFACES OF FIBER OPTIC CONNECTORS

BACKGROUND

Optical connectors typically have a housing holding the optical ferrule with an optical fiber. The end faces of such ferrules need to be a certain, optimum shape to prevent misalignments, air gaps, reflections, or scattering of light at interfaces at which optical fibers need to be coupled in an optical fiber link. Because of the precision needed, the end faces of optical connectors need to be inspected. Imperfections in the end faces of optical connectors are compounded by being summed with similar imperfections at other fiber junctions in the system and ultimately can lead to greatly increased light attenuation, lower signal to noise ratios, and lower system band width. To assure the necessary physical contact between two mating fibers, the ends can be angled and polished, as described above, and factors such as radius of curvature, fiber height, and apex offset of the polish with respect to the center of the fiber is controlled. These types of parameters will help to insure physical contact between the fibers, thereby minimizing loss and back reflection.

Before these connectors are installed in the field, they need to be inspected. Inspection can involve visual inspection to identify imperfections and debris, as well as to measure, for example, the radius of curvature, the apex offset, and the fiber height. Various inspection machines have been developed for providing this type of testing. In general, these machines utilize interferometer-based systems. These systems are generally manual in nature, in that the systems require an operator to manually manipulate each connector that is processed by the systems.

Improvements in the inspection of connector ends are desirable.

SUMMARY

One aspect of this disclosure relates to an example system for inspecting the end faces of fiber optic connectors. The system includes a fixture holding a plurality of fiber optic connectors. The system also includes an inspection device configured to inspect end faces of each of the fiber optic connectors, the inspection device including a movement device to which the fixture is coupled, the movement device being configured to move the inspection device relative to the fixture to allow all of the end faces to be inspected. The system also includes a computer system connected to the inspection device, the computer system being programmed to control the inspection device, display inspection data from the inspection device, and store the inspection data.

DESCRIPTION OF THE DRAWINGS

Reference will now be made to the accompanying drawings, which are not necessarily drawn to scale.

DETAILED DESCRIPTION

Example embodiments will now be described more fully hereinafter with reference to the accompanying drawings. These embodiments are provided so that this disclosure will be thorough and complete. Like numbers refer to like elements throughout.

The systems and methods disclosed herein are configured to inspect the end faces of the ferrules of fiber optic connectors. In the examples shown, the inspection process can include visual inspection to detect various defects associated with the end face of a connector, such as scratches, pits, chips, and/or contaminants. The inspection process can also include interferometer inspection to detect other defects associated with the end face of the connector, such as apex offset, fiber height, and radius of curvature. In some examples, the inspection process can be used to identify connectors that have defects such that the defective connectors should be cleaned, reworked, and/or marked as failed. In this manner, the quality of the resulting fiber optic connectors is increased.

Figure 1:
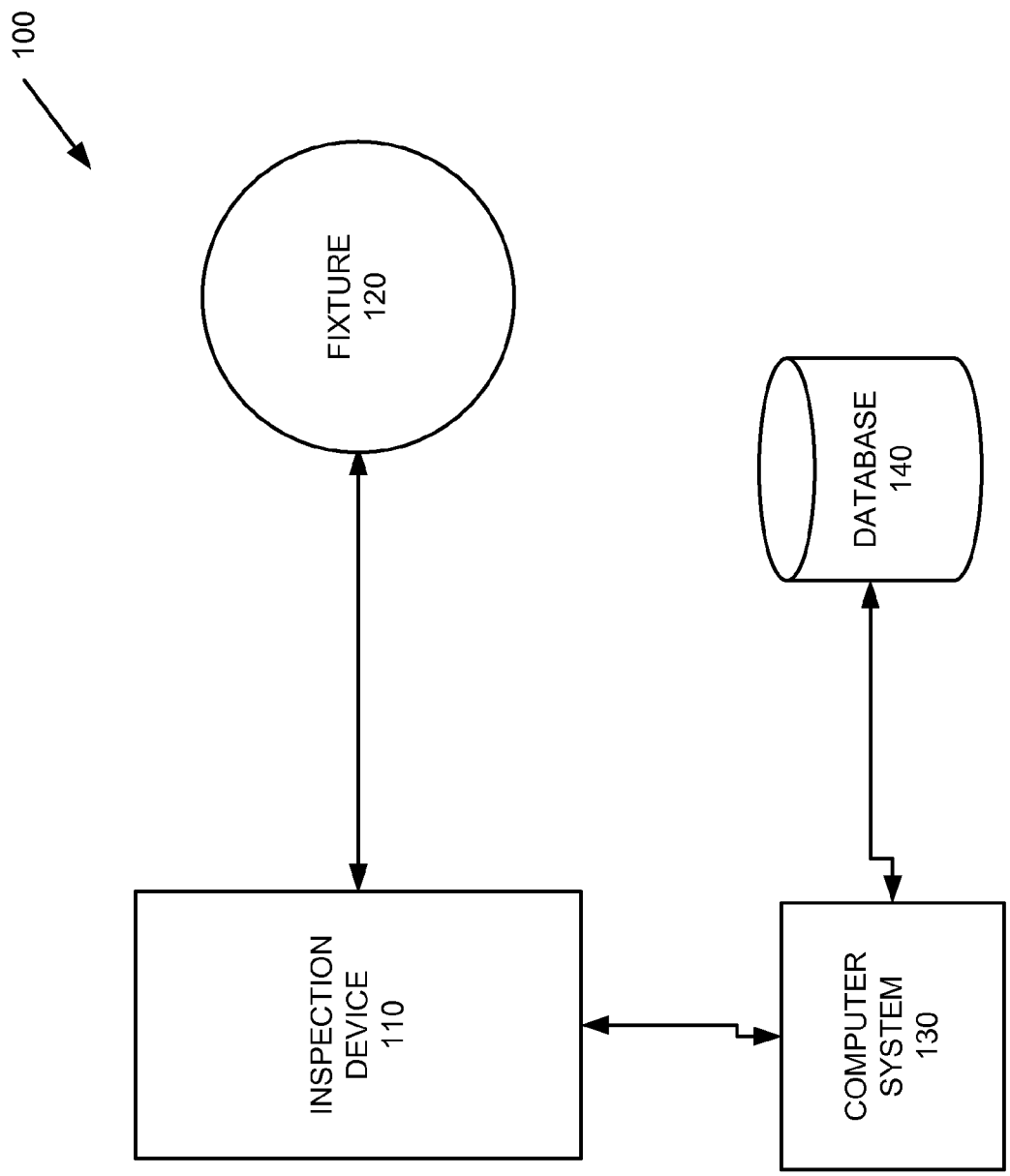
FIG. 1 illustrates an example system for inspecting the end faces of fiber optic connectors.
Figure 2:
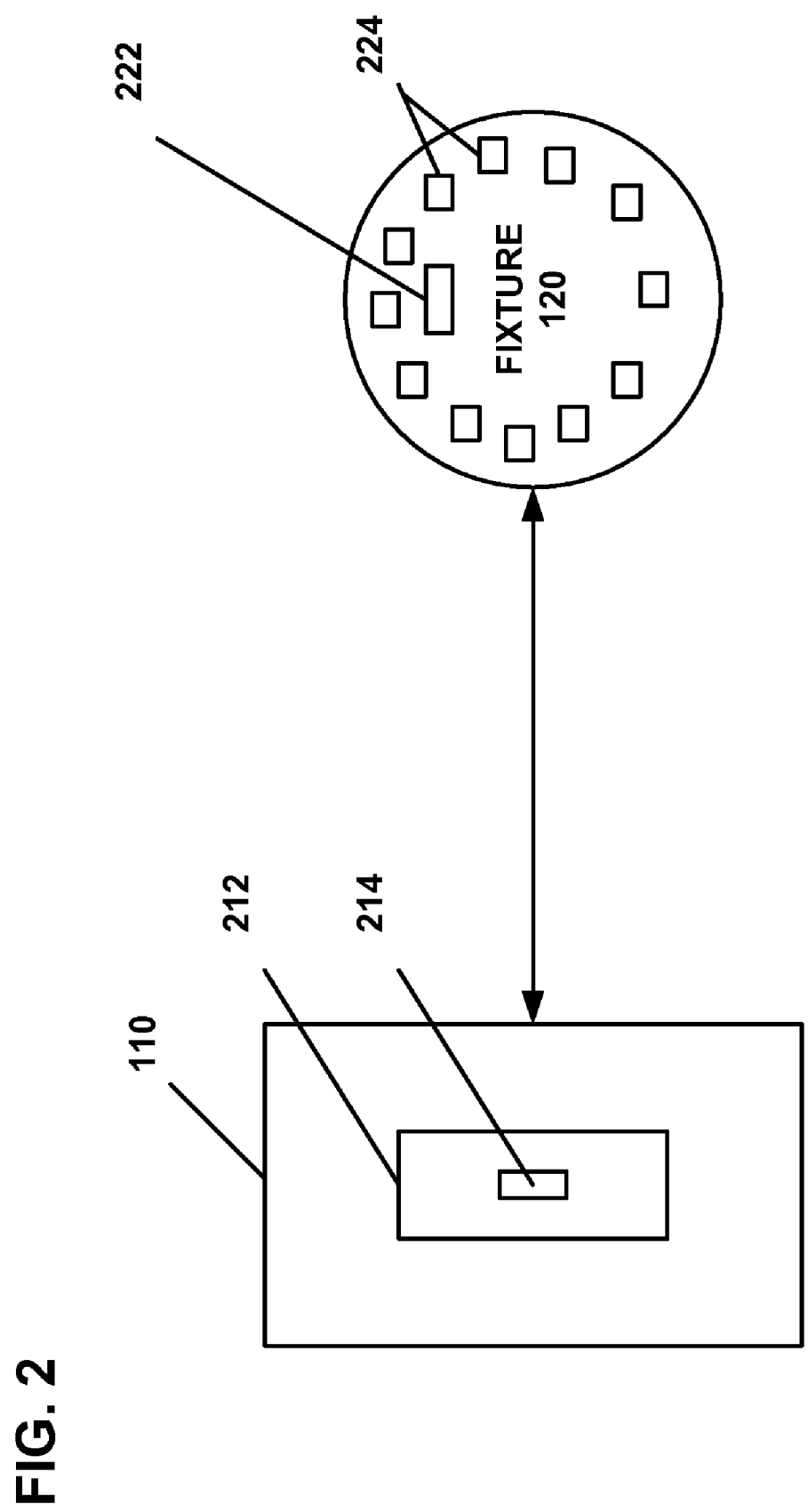
FIG. 2 illustrates an example inspection device and fixture.

Referring now to FIGS. 1 and 2, an example system 100 for inspecting the end faces of fiber optic connectors is shown. System 100 includes an inspection device 110, a fixture 120, a computer system 130, and a database 140.

Inspection device 110 is configured to inspect the end face of one or more fiber optic connectors. In the example shown, inspection device 110 includes a head 214 that is configured to inspect the end faces of the fiber optic connectors. For example, in one embodiment, inspection device 110 is configured to detect various defects that can be associated with the end face of a connector, such as scratches, pits, chips, and/or contaminants (sometimes referred to herein as "visual inspection"). Inspection device 110 can also be configured to measure various other aspects of the end face of the connector, such as apex offset, fiber height, and radius of curvature (sometimes referred to herein as "interferometer inspection").

In the arrangement shown, head 214 includes both imaging components that are configured to capture images of the end face of a connector for visual inspection, as well as capture interference images for interferometer inspection. In one example, head 214 can examine the end face using a specified resolution, such as at least 0.43 microns per pixel. In addition, head 214 can be configured to detect scratches, pits, chips, and contaminants of less than 1 micron in size. Head 214 can further be configured to identify if such defects are located above or below the surface of the connector end face.

In example arrangements, inspection device 110 is configured to divide the end face of the connector into one or more zones during inspection. In one arrangement, each zone is a circular area defined on the end face of the ferrule of the connector. Each zone can include a specified set of test criteria for that zone. The criteria can be a maximum number, size, and/or total area of any defects detected within the zone, such as scratches, pits, chips or defects. Each zone can have a different set of criteria. Any defects falling inside two zones are ignored by the criteria of the outer zone.

The first zone is typically defined in the center of the end face. The second and subsequent zones begin where the previous zone left off and are spaced radially outwardly from the center. In one example, inspection device 110 can divide the end face into at least ten zones, with each zone ranging in diameter from 1 to 500 microns. Other configurations are possible.

In examples shown, inspection device 110 includes an interferometer. Examples of systems including interferometers include, without limitation, those disclosed in U.S. Pat. Nos. 6,831,738, 6,215,555, and 5,459,564, and U.S. Patent Application Publication No. 2005/0206889, the entireties of which are hereby incorporated by reference. Other configurations are possible.

An example movement device 212 of inspection device 110 is configured to move head 214 so that head 214 can inspect each connector in fixture 120. In one example, movement device 212 is a motorized stage or table that moves in at least two directions (i.e., X and Y directions) so that head 214 can be automatically positioned to inspect each connector. In this manner, head 214 can be automatically incremented or moved by movement device 212 to inspect each connector in fixture 120 without requiring user intervention.

In example arrangements, fixture 120 can be positioned in a vertical, horizontal, or angled position when coupled to inspection device 110 for inspection of the end faces of the connectors held therein. Alternative configurations are possible. For example, in one alternative embodiment, inspection device 110 can be configured to move fixture 120 (e.g., by rotational and/or lateral movement) so that head 214 can inspect each connector. In another example, multiple heads can be provided so that only limited or no movement is required.

In one example, inspection device 110 is configured to inspect each connectors held by fixture 120 within a specified amount of time. For example, in the arrangement shown, the time to inspect each connector is less than 14 seconds. Other configurations are possible.

Fixture 120 includes one or more connector locations 224 that are configured to hold one or more fiber optic connectors for testing by inspection device 110. In example arrangements, fixture 120 is configured to hold a plurality of fiber optic connectors such that the end faces of the connectors are accessible for inspection by inspection device 110.

One example of a fixture that can be used in system 100 is that shown in U.S. Pat. No. 6,987,921, which is hereby incorporated by reference. Such a fixture is capable of holding twelve connectors in a circular arrangement. Other examples of fixtures include those shown in U.S. Pat. Nos. 5,577,149, 6,396,996, and 7,068,906, the entireties of which are hereby incorporated by reference. Other configurations are possible. For example, fixtures holding more or less connectors (e.g., up to thirty-six connectors), or of varying shapes and sizes, can be used.

In some arrangements, fixture 120 can serve a variety of functions. For example, fixture 120 can be used to hold the connectors during preliminary processing of the connectors, such as during polishing. Fixture 120 can then be used to hold the connectors during inspection by inspection device 110, such that the connectors need not be removed after polishing and placed into a different fixture. In other examples, fixture 120 is used only to hold the connectors during inspection by inspection device 110.

As shown in FIG. 2, once fixture 120 is connected to inspection device 110, inspection device 110 is configured such that head 214 is moved by movement device 212 to inspect each connector held by fixture 120.

In example embodiments, fixture 120 includes a feature 222 that is read by inspection device 110 to assist in configuration. For example, feature 222 allows inspection device 110 to ascertain information about fixture 120 and the connectors attached thereto. Examples of such information include the number of connector locations in fixture 120, the type of connectors (e.g., SC, FC, LC, LX.5, etc.) held by fixture 120, and the shape of fixture 120. In this manner, inspection device 110 can "auto-recognize" fixture 120 when fixture 120 is attached thereto. In one embodiment, feature 222 is a bar code that is read by inspection device 110 when fixture 120 is attached thereto. In other embodiments, feature 222 can be a specified series of holes in fixture 120 that can be detected by inspection device 110, or a radio frequency identification (RFID) tag that can be read by inspection device 110. Other configurations are possible.

Referring again to FIG. 1, inspection device 110 is connected to computer system 130 of system 100. In one arrangement, inspection device 110 is connected to computer system 130 using a USB port, although other configurations, such as a serial connection, can be used. In the arrangement shown, inspection device 110 is powered through the USB connection with computer system 130.

Computer system 130 includes a processing unit, memory such as volatile and non-volatile computer readable media, a removable media drive, input/output devices such as a display, keyboard, and mouse, and one or more communication ports such as Ethernet ports, USB ports, and serial ports. Computer system 130 includes an operating system, such as the WINDOWS XP or WINDOWS VISTA operating systems offered by Microsoft Corporation of Redmond, Wash. Computer system 130 also includes one or more applications running thereon.

In use, computer system 130 is connected to and programmed to communicate with inspection device 110. For example, computer system 130 is programmed to receive and store inspection data from inspection device 110 and to control the operation of inspection device 110, as described further below.

Computer system 130 is also connected to database 140. Database 140 includes both operational data used to configure inspection device 110, as well as provides for the storage of data from device 110. For example, database 140 can include data regarding the layout of a plurality of fixtures, and computer system 130 can access this data to determine the layout during inspection of connectors in a particular fixture by inspection device 110. In addition, data from inspection device 110 can be stored in database 140 once inspection of the connectors in a fixture is completed. In example embodiments, database 140 is a centralized database that can be accessed by multiple inspection devices 110. Other configurations are possible.

Figure 3:
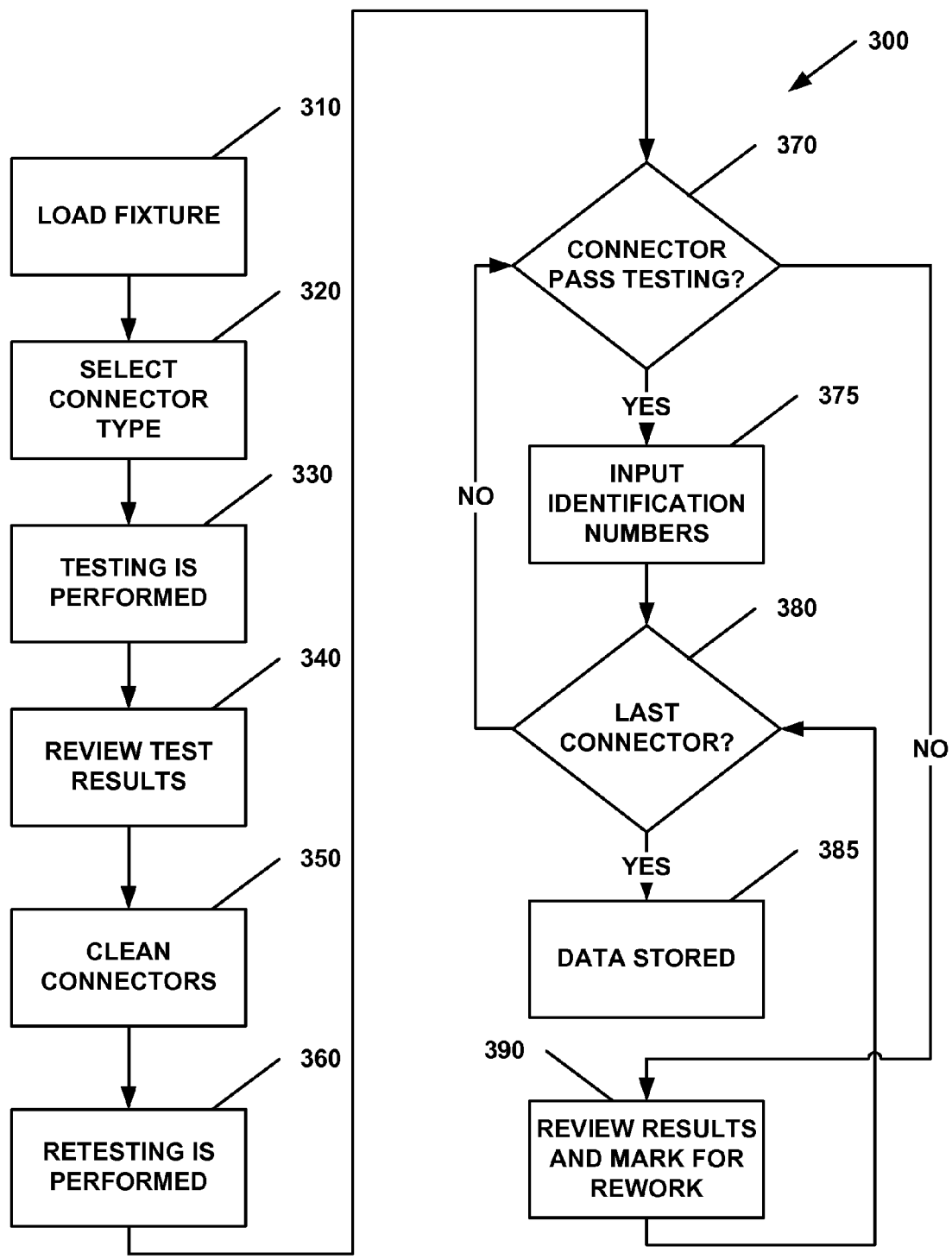
FIG. 3 illustrates an example method for inspecting the end faces of fiber optic connectors.

Referring now to FIG. 3, an example method 300 for inspecting the end faces of fiber optic connectors using a device such as inspection device 110 is shown. Method 300 begins at operation 300, at which the user loads the fixture (e.g., fixture 120) including a plurality of fiber optic connectors into the inspection device. Next, at operation 320, the type of connector to be inspected is inputted, or the inspection device can automatically determine the connector type by auto-recognizing the fixture using a feature on the fixture (e.g., feature 222), if available.

Next, at operation 320, testing of the connectors is performed. Generally, the inspection device performs visual inspection and interferometer inspection on the end face of each connector in the fixture. Additional details of operation 320 are provided in FIG. 4, described below.

Control is then passed to operation 350, and any connectors that failed the visual inspection due to inadequate cleanliness can be cleaned. In one example, the connectors are manually cleaned by the user. In another example, the inspection device and/or another device can be configured to automatically clean those connectors that fail the visual inspection due to cleanliness, using a chemical or mechanical cleaning process. For example, the automated cleaning process can start with a chemical agent to clean the end face of each failed connector, and subsequently use a mechanical process to clean those connectors that continue to fail the visual inspection. Next, at operation 360, re-testing is performed on any of the failed connectors. In alternative examples, every connector can be re-tested, if desired.

Next, at operation 370, a determination is made as to whether a connector passed the visual inspection and interferometer inspection. If the connector passes, control is passed to operation 375, and identification numbers (e.g., serial number, subunit, and fiber ID) for the connector are inputted into computer system 130, as described further below. Next, at operation 380, a determination is made as to whether the current connector is the last connector in the fixture. If it is the last connector, control is passed to operation 385, and the data collected about the connectors is stored by the computer system (e.g., computer system 130), as described further below. Otherwise, if it is not the last connector, control is passed back to operation 370.

If it is determined at operation 370 that the connector fails the visual inspection or the interferometer inspection, control is passed to operation 390, and the connector is marked for reworking. Control is then passed to operation 380.

Figure 4:
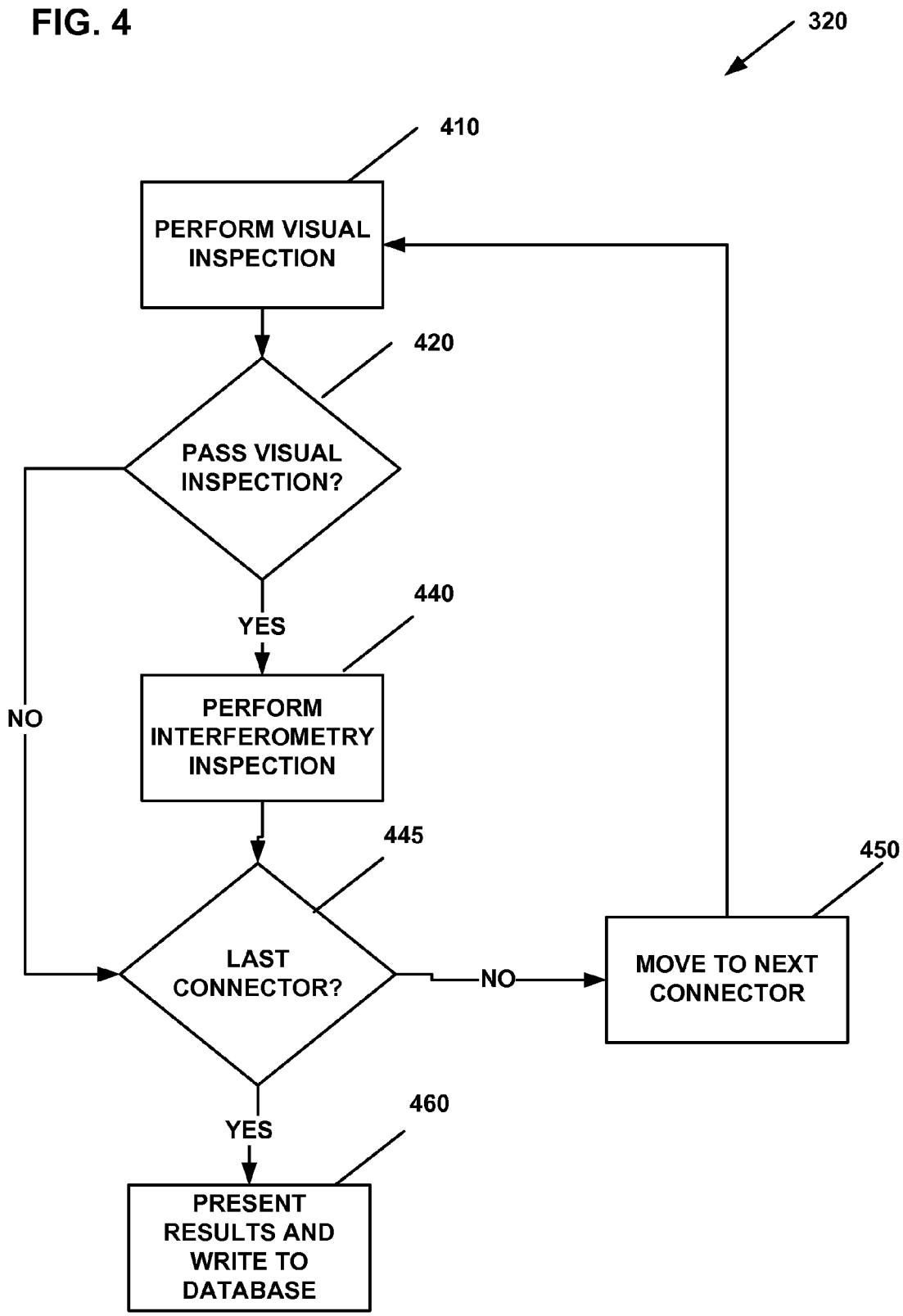
FIG. 4 illustrates a part of the method for inspecting the end faces of fiber optic connectors of FIG. 3.

Referring now to FIG. 4, example operation 320 involving the testing of the connectors is shown in greater detail. Initially, at operation 410, a visual inspection of the end face is performed. Next, at operation 420, a determination is made as to whether or not the connector passes the visual inspection.

For example, defects including scratches, pits, chips, and/or contaminants can be identified during the visual inspection. If the scratches, pits, chips, and/or contaminants reach a certain magnitude, the connector can be noted as failing the visual inspection. In some examples, the failure is dependent on the zone in which the defect is detected. For example, if a cleanliness defect is noted in a zone outside that which is important for performance (e.g., near the outer edge of the end face), the defect can be ignored and the connector can pass the inspection, assuming that other defects are not detected.

In example embodiments, the criteria for determining whether a connector passes or fails the visual inspection can vary from zone to zone defined on the end face of the connector. For example, the criteria can be defined such that zones near the center of the end face have more rigorous criteria as compared to those zones positioned at the outer edge of the end face. In addition, the criteria can vary depending on the connector type.

If the connector passes visual inspection, control is passed from operation 420 to operation 440, at which interferometer inspection is performed. The interferometer inspection can include inspection for radius (e.g., from 3 to 30 millimeters), apex (e.g., from 0 to 60 microns), and fiber length (e.g., from −100 to 200 nanometers). The actual criteria can vary depending on the connector type.

Control is then passed to operation 445, and a determination is made as to whether or not the currently tested connector is the last connector in the fixture. If a determination is made that it is not the last connector, control is passed back to operation 420. If a determination is made that it is the last connector, control is passed to operation 460, and the results of the testing are written to the database (e.g., database 140), along with a time stamp to indicate the date and time the inspection was completed.

If a determination is made at operation 420 that the connector does not pass the visual inspection, control is passed to operation 445, and interferometer inspection in operation 440 is skipped. In alternative examples, each connector can undergo interferometer inspection regardless of whether or not the connector passes visual inspection.

Figure 5:
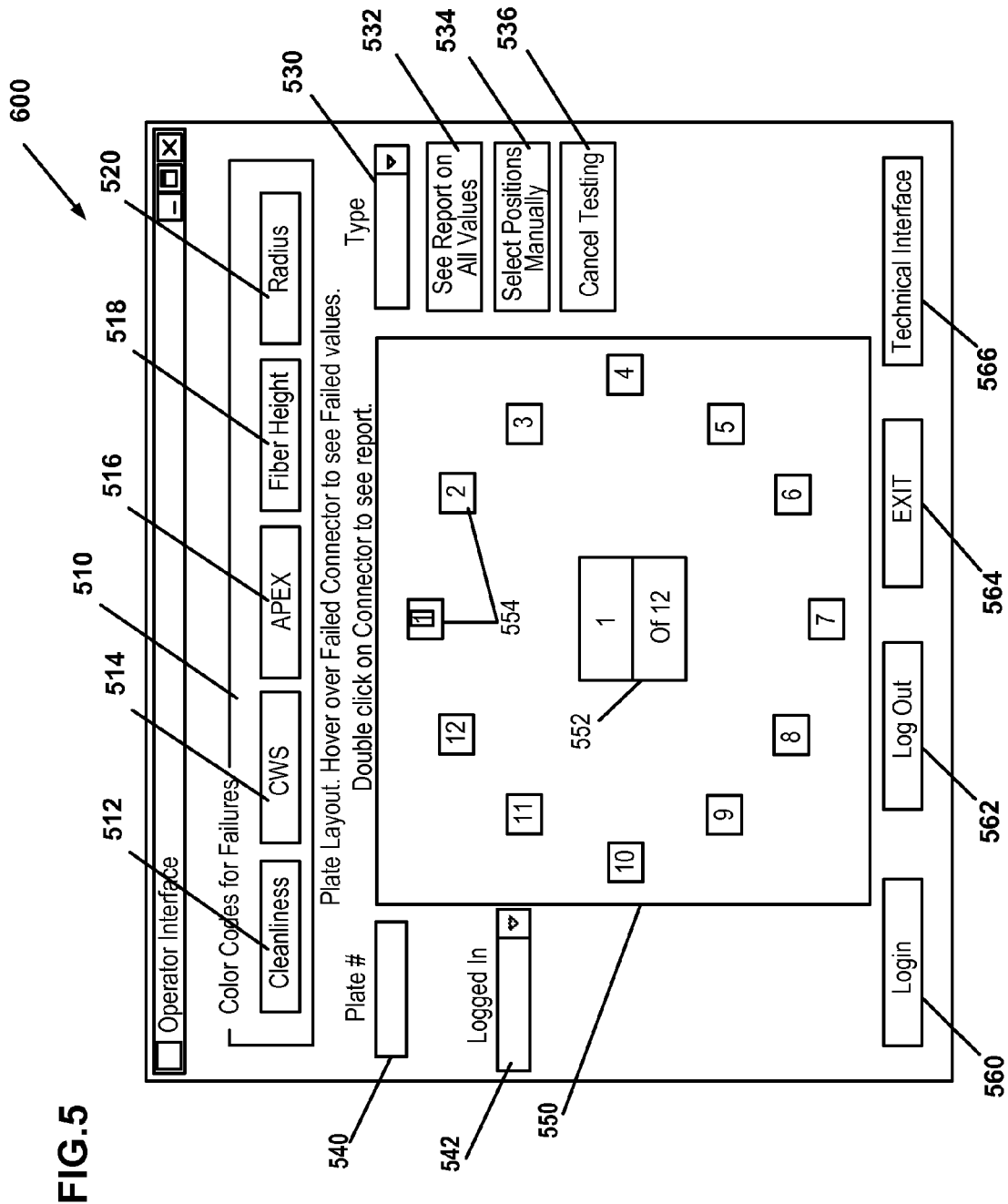
FIG. 5 illustrates an example graphical user interface for controlling an inspection device of the system of FIG. 1.
Figure 6:
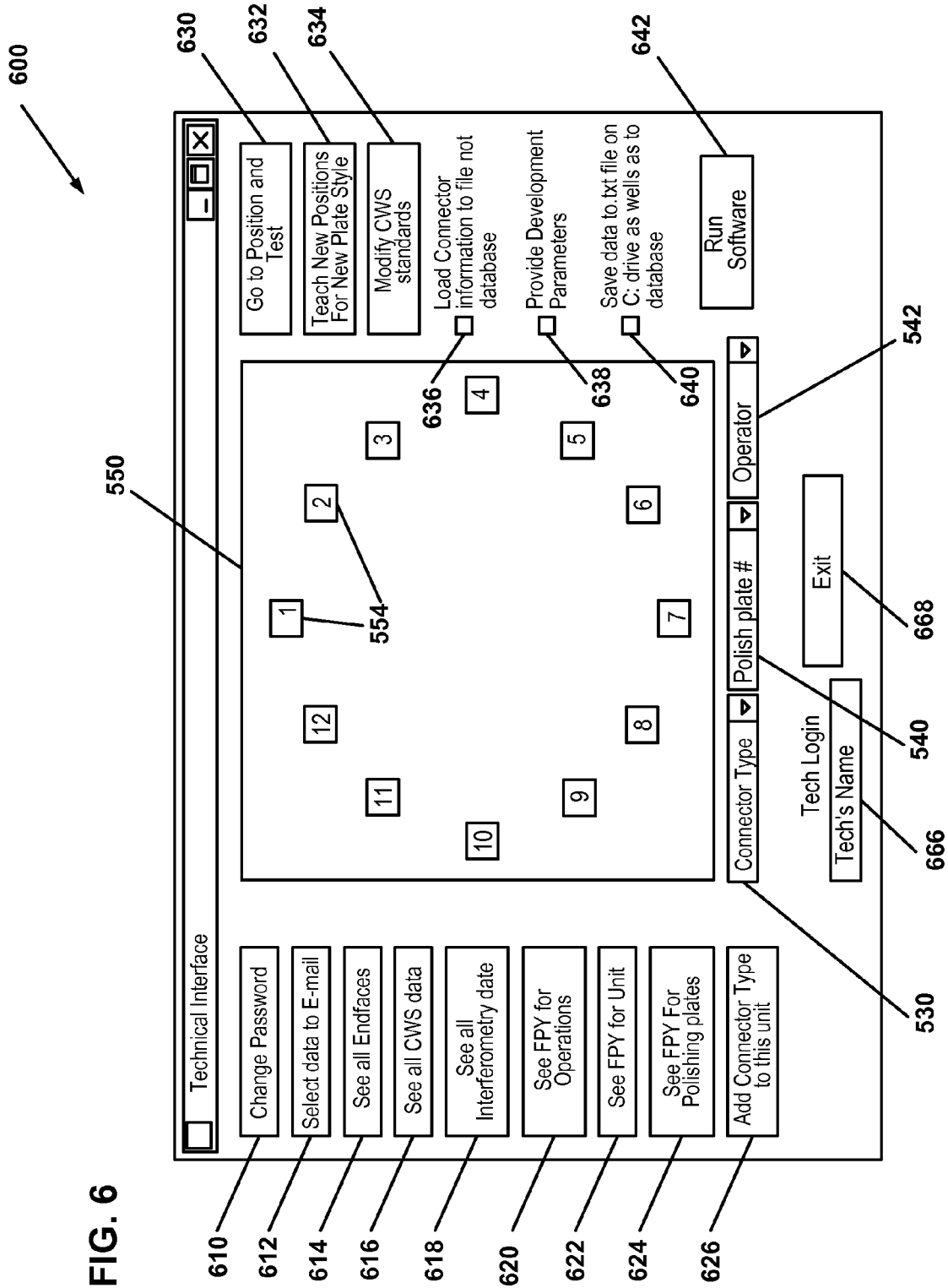
FIG. 6 illustrates an example graphical user interface for accessing technical information for a computer system and inspection device of the system of FIG. 1.
Figure 7:
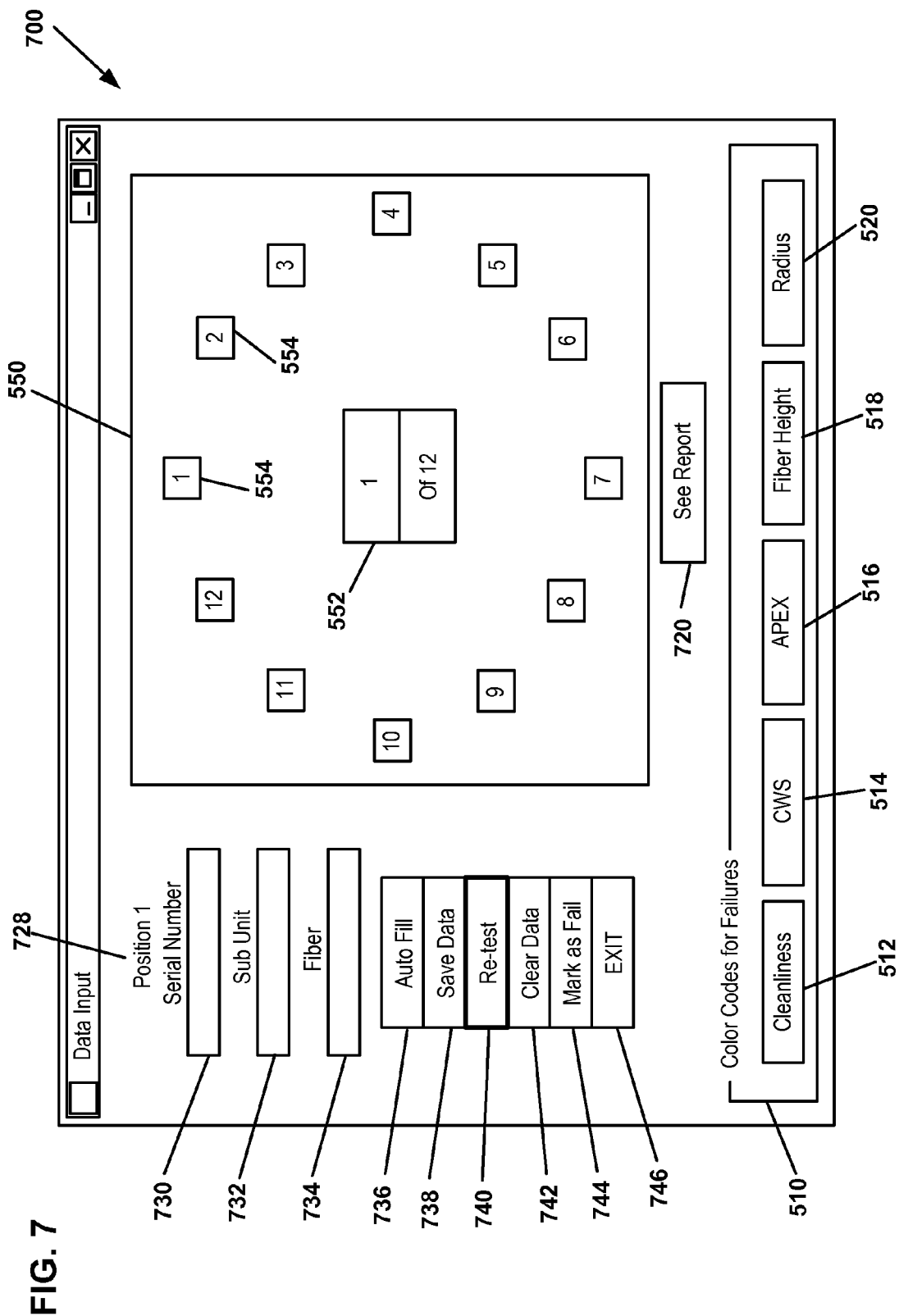
FIG. 7 illustrates an example graphical user interface for accessing and storing data after initial inspection using the inspection device of the system of FIG. 1.

Referring now to FIGS. 5-7, computer system 130 includes one or more application programs installed thereon to assist in the control of inspection device 110, and the storage and presentation of data collected by inspection device 110.

For example, referring to FIG. 5, an example graphical user interface 500 is shown. Interface 500 generally is used to control the operation of inspection device 110 during inspection of the end faces of the connectors, and to review the results of the inspection.

A login button 560 of interface 500 allows a user of system 100 to login to computer system 130 to use inspection device 110. In examples, the user is presented with a login screen requesting a user name and password upon selection of button 560. Once the user is logged in, the user can select the user's name from the user dropdown menu 542. A log out button 562 can be selected to log the currently logged in user out of the system. An exit button 564 can be selected to close interface 500 on computer system 130. A technical interface button 566 can be selected to access interface 600 of FIG. 6, described further below. In examples, a user is only granted access to interface 600 after the user's credentials are checked to determine that the user has privileges to access interface 600.

A plate or fixture number entry box 540 displays the plate number of the fixture that is currently connected to the inspection device. This number can be auto-populated if the inspection device can auto-recognize the fixture, or the number can be manually entered in box 540 by the user. The plate number in box 540 is used to determine the layout of the connectors on the fixture. This, in turn, determines the layout of a layout box 550.

Layout box 550 is a graphical representation of the fixture and the connectors held thereby. Layout box 550 includes a plurality of connector positions 554 visually arranged in the same manner as the connector locations are positioned on the actual physical fixture. A progress label 552 in layout box 550 is visible during the inspection process. Progress label 552 indicates the number of the current connector position 554 under inspection, as well as the total number of connector positions 554.

Each connector position 554 is numbered and color-coded to indicate whether or not the connector at that connector position 554 has been inspected. For example, all connector positions 554 are initially shown in white, and the color of inspected connector positions 554 is changed depending on the outcome of the inspection, as described below. In addition, after inspection, the user can hover the mouse over a particular connector position 554 to receive specific information about the data associated with the inspection.

For example, a label legend 510 includes a plurality of labels 512, 514, 516, 518, 520 that denote different reasons for failure of a particular connector. For example, cleanliness label 512 indicates a failure for cleanliness, visual label 514 indicates a failure during visual inspection, and labels 516, 518, 520 indicate a failure during interferometer inspection. Labels 512, 514, 516, 518, 520 are coded using, for example, colors that are applied to connector positions 554 to visually indicate a reason for the failure of a particular connector. For example, if a connector fails visual inspection, the connector position 554 associated with that connector is changed to the color of cleanliness label 514 to so indicate. See interface 700 shown in FIG. 7.

Cleanliness label 514 is yellow and denotes a failure for cleanliness. Such a failure can be remedied by cleaning the end face of the failed connector, and the end face can then be inspected again using a re-test mode. See re-test button 740 of interface 700, described below.

Visual inspection label 516 is green and denotes a failure of the visual inspection of the connector due to scratches, pits, chips, and/or contaminants. A connector failing the visual inspection can be reworked and inspected again using the re-test mode.

Apex label 516 is blue and denotes a failure due to apex offset. Fiber height label 518 is orange and denotes a failure for an improper fiber length. Radius label 520 is red and denotes a failure for an improper radius. A connector failing for apex offset, fiber height, or apex can be reworked and inspected again using the re-test mode.

In one embodiment, if a connector exhibits multiple failures, a precedence can be used to indicate such failures in the respective connector positions 554 in layout box 550. For example, fiber height failures are always indicated, followed by apex offset, and radius in descending order. In other words, if a connector exhibits both fiber height and apex offset defects, connector position 554 for that connector is color-coded orange because fiber height has a higher precedence than apex offset. In alternative embodiments, all failures can be indicated for each connector by, for example, providing multiple colors in each failed connector position 554. Another color, such as grey, can be used to code those connector positions 554 for connectors that pass inspection.

Although color is described herein as one method for indicating differing failure causes for specific connectors, other methods can be used. For example, in one alternative, each connector position 554 including a failed connector can be replaced with a textual representation indicating the reason for the failure.

A type dropdown box 530 defines the type of connector (e.g., FC, SC, LC, LX.5) held by the fixture connected to the inspect device. Box 530 can be automatically populated through auto-recognition of the fixture, or can be manually entered by the user.

A manual button 534 can be selected in a situation wherein a connector has been reworked and the fixture is not include fully populated with connectors to be re-tested. If manual button 534 is selected, the user is then able to manually select which connector locations include connectors that need inspection. For example, when manual button 534 is selected, each connector location 554 includes a drop-down menu that allows the user to select the connector location 554 for inspection. Each connector location 554 that is manually selected for inspection can be highlighted on interface 500 to indicate which connector locations 554 are selected. For example, all connector locations 554 can initially be shown in white, and once manually selected, the color for each selected connector location 554 can be changed to green. Other color arrangements can be used.

A report button 532 can be selected by the user to access all of the measurements taken by the inspection device related to the visual inspection and the interferometer inspection, as well as a photograph of each end face. This report can be saved and/or communicated using, for example, e-mail.

A cancel button 536 can be selected to cancel the current inspection process. If selected, the user is prompted with an option to save the data associated with the connector end faces that have already been inspected, or to discard such data.

Referring now to FIG. 6, example interface 600 is shown. Interface 600 provides access to technical information about the inspection device and the computer system.

For example, a change password button 610 can be selected to manage user accounts on the computer system, including adding and deleting accounts and changing users' passwords. Such changes can be tracked in the database. A select data to e-mail button 612 can be selected to allow the user to have data associated with an inspection sent to one or more email addresses.

An end face button 614 can be selected to allow the user to access a photograph of the end face of any of the connectors that has been inspected. A visual button 616 allows the user to access all of the data associated with the visual inspection of the connectors in a fixture. Likewise, an interferometer button 618 allows the user to access all of the data associated with the interferometer inspection of the connectors in the fixture.

An FPY for operators button 620 can be selected to access a report regarding the first pass yield for an operator of the system (i.e., the number of connectors for the operator that pass first inspection compared to the total number of connectors tested by that operator using the system). Likewise, an FPY for unit button 622 can be selected to access a report regarding the first pass yield for a particular fixture.

An add connector type button 626 can be selected to add another connector type for the inspection device. For example, an FC connector type can be added to allow the inspection device to inspect FC type connector end faces.

Interface 600 also includes layout box 550, connector positions 554, type dropdown box 530, plate or fixture number entry box 540, and user dropdown menu 542. The current user that is logged into the computer system is shown in login box 666.

A go to position button 630 can be selected to allow the user to select a particular connector position 554 for the unit to go to and perform inspection. The inspection can be visual, interferometer, or both.

A teach button 632 can be selected to allow the user to add a new fixture to the system. This can include allowing the user to define the number and position of connector positions 554 in the fixture, as well as allow the user to add a new fixture to the database. If a new fixture or plate of a known configuration is added, the user can choose the layout for the fixture from the plurality of standard fixture layouts included in the database.

A modify standards button 634 allows the user to modify the standards by which connectors are evaluated and pass/fail determinations are made. For example, the user can change the apex offset range that is acceptable to increase or decrease passing rates for particular connector types.

A load checkbox 636, if selected, allows the user to save inspection data to a file locally on the computer system, rather than in the database. The files can be saved in a text format and later uploaded to the database, if desired. For example, if load checkbox 636 is unchecked at a later time, the system can be programmed to automatically upload the data from the computer system to the database. A save data checkbox 640, if selected, allows the user to have the data from the inspection device saved both locally to a text file and to the database.

A development parameters checkbox 638, if selected, allows for additional parameters to be collected and reported by the inspection device. For example, such parameters can include: angle (i.e., a measure of the polished angle for angled connectors), bearing (i.e., a measure of the direction of the apex and apex offset); key error (i.e., a measure of the offset in the vertical axis); and fiber roughness (i.e., a measure of the smoothness of the end face). Other parameters can also be provided.

A run software button 642 can be selected to access third-party software associated with the inspection device or the database. For example, run software button 642 can be selected to load software specific to the inspection device for calibration thereof. An exit button 668 can be selected to exit from interface 600 back to interface 500.

Referring now to FIG. 7, example interface 700 is shown. Interface 700 provides access to information after initial inspection is complete.

For example, interface 700 includes layout box 550 with connector positions 554 color-coded according to labels 512, 514, 516, 518, 520 of label legend 510. The user can review the results of the inspection and select a report button 720 to access all of the measurements taken by the inspection device related to the visual inspection and the interferometer inspection, as well as a photograph of each end face. This report can be saved and/or communicated using, for example, e-mail.

A re-test button 740 can be selected to re-test any failed connector. In one example, re-test is automatically initiated when a connector fails for cleanliness and is subsequently cleaned and the fixture is re-attached to the inspection device. In other embodiments, the user can manually select to re-test any failed connector. When re-test button 740 is selected, the data that has been collected is saved, and the inspection device pauses to allow the user to rework the failed connector. Once this is complete, the inspection device re-tests each failed connector and skips the connectors that originally passed. If a previously-failed connector passes the re-test, the state of the connector is changed from failed to passing.

If a connector does not pass after re-testing, the user can select mark as fail button 744 to mark a connector as failed. The user can flag a specified failure for the connector, such as visual or interferometer.

A position label 728 indicates the position of the connector position 554 that is currently in focus for data entry and/or selection for marking as failed. A serial number text box 730, sub-unit text box 732, and fiber text box 734, allow the user to input a serial number, sub-unit number, and fiber number for the connector in focus. If the user fills in this information for one connector, an auto-fill button 736 can subsequently be selected, and the information is auto-populated for the remaining connectors in the fixture. Auto-fill button 736 is disabled when the fixture includes connectors that have failed for cleanliness, so that the user can rework and re-test these connectors to see if the connectors can pass, or eventually mark the connectors as failed.

A save data button 738 can be selected to save the data from the inspection device to the database. A clear data button 742 allows the user to clear the data in all of the input fields of interface 700 to allow for the input of new data. An exit button 746 can be selected to exit from interface 600 back to interface 500. If data from the inspection device has not been saved, the user is prompted to save the data, or the data is discarded.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A system for inspecting end faces of fiber optic connectors, the system comprising:
   a fixture holding a plurality of fiber optic connectors;
   an inspection device configured to inspect end faces of each of the fiber optic connectors, the inspection device including a movement device to which the fixture is coupled, the movement device being configured to move the inspection device relative to the fixture to allow all of the end faces to be inspected; and
   a computer system connected to the inspection device, the computer system being programmed to control the inspection device, display inspection data from the inspection device, and store the inspection data, and the computer system including a graphical user interface programmed to provide a visual representation of the fixture and to indicate a pass status or a failed status for each of the fiber optic connectors held by the fixture, wherein the graphical user interface includes a plurality of connector positions, each of the connector positions corresponding to one of the plurality of the fiber optic connectors.

2. The system of claim 1, wherein the movement device is a motorized stage or table that moves in at least two directions.

3. The system of claim 1, wherein the inspection device is programmed to perform both a visual inspection and an interferometer inspection for each of the fiber optic connectors.

4. The system of claim 1, wherein each of the connector positions is color-coded to indicate a state of inspection.

5. The system of claim 1, wherein the graphical user interface includes a number entry box programmed to receive an identifier for the fixture.

6. A method for inspecting end faces of fiber optic connectors, the method comprising:
   loading the fixture;
   selecting a connector type for the fiber optic connectors;
   inspecting end faces of the fiber optic connectors using an inspection device, including:
      performing a visual inspection of a first of the fiber optic connectors;
      if the first of the fiber optic connectors passes the visual inspection, performing an interferometer inspection of the first of the fiber optic connectors;
      moving the inspection device to a second one of the fiber optic connectors; and
      performing an inspection of the second one of the fiber optic connectors; and
   updating a user interface based on the inspection, including changing a color of a connector position associated with the first one of the fiber optic connectors based on the inspection.

7. The method of claim 6, further comprising marking for rework the first one of the fiber optic connectors if the first one of the fiber optic connectors fails inspection.

8. A system for inspecting end faces of fiber optic connectors, the system comprising:
   a fixture holding a plurality of fiber optic connectors;
   an inspection device configured to inspect end faces of each of the fiber optic connectors, the inspection device including a movement device to which the fixture is coupled, the movement device being configured to move the inspection device relative to the fixture to allow all of the end faces to be inspected; and
   a computer system connected to the inspection device, the computer system being programmed to control the inspection device, display inspection data from the inspection device, and store the inspection data, and the computer system including a graphical user interface programmed to provide a visual representation of the fixture and to indicate a pass status or a failed status for each of the fiber optic connectors held by the fixture, wherein the graphical user interface includes a plurality of connector positions, each of the connector positions corresponding to one of the plurality of the fiber optic connectors, wherein each of the connector positions is color-coded to indicate a state of inspection, including:

all of the connector positions are initially shown in a single color indicating that inspection has not been completed;

a color of each of the connector positions is changed depending on the state of inspection, including providing one color to indicate the pass status for a connector when the connector passes the inspection, and a plurality of other colors to indicate the failed status when the connector fails the inspection, the colors indicating a reason for failure; and when the connector exhibits multiple failures, applying a precedence to determine which of the plurality of other colors to apply for the connector.

* * * * *